United States Patent
Bunel et al.

(10) Patent No.: US 11,480,340 B2
(45) Date of Patent: Oct. 25, 2022

(54) GUIDING DEVICE IN A COMBUSTION CHAMBER

(71) Applicant: SAFRAN AIRCRAFT ENGINES, Paris (FR)

(72) Inventors: Jacques Marcel Arthur Bunel, Moissy-Cramayel (FR); Alexandre Eric Lefebvre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 45 days.

(21) Appl. No.: 17/256,963

(22) PCT Filed: Jun. 28, 2019

(86) PCT No.: PCT/FR2019/051613
§ 371 (c)(1),
(2) Date: Dec. 29, 2020

(87) PCT Pub. No.: WO2020/002858
PCT Pub. Date: Jan. 2, 2020

(65) Prior Publication Data
US 2021/0131666 A1 May 6, 2021

(30) Foreign Application Priority Data
Jun. 29, 2018 (FR) ...................... 1855984

(51) Int. Cl.
*F23R 3/28* (2006.01)
*F23R 3/00* (2006.01)
(Continued)

(52) U.S. Cl.
CPC ............... *F23R 3/283* (2013.01); *F02C 7/22* (2013.01); *F02C 7/266* (2013.01); *F23R 3/002* (2013.01);
(Continued)

(58) Field of Classification Search
CPC .. F02C 7/22; F02C 7/266; F23R 3/002; F23R 3/283; F23R 3/44; F23R 2900/00012; F23R 2900/00017; F23R 2900/00018
See application file for complete search history.

(56) References Cited

U.S. PATENT DOCUMENTS

| | | | |
|---|---|---|---|
| 2007/0068166 A1 | 3/2007 | Gautier et al. | |
| 2009/0151361 A1* | 6/2009 | Audin | F23R 3/002 60/740 |

(Continued)

FOREIGN PATENT DOCUMENTS

| | | | |
|---|---|---|---|
| CA | 2593186 A1 * | 12/2007 | ............ F23D 11/107 |
| EP | 1770332 A1 | 4/2007 | |
| FR | 2988436 A1 | 9/2013 | |

OTHER PUBLICATIONS

International Search Report dated Oct. 14, 2019, issued in corresponding International Application No. PCT/FR2019/051613, filed Jun. 28, 2019, 2 pages.

(Continued)

*Primary Examiner* — Scott J Walthour
(74) *Attorney, Agent, or Firm* — Christensen O'Connor Johnson Kindness PLLC

(57) ABSTRACT

The present disclosure provides devices for guiding an element in a combustion chamber wall opening. Between the welds or brazes joining a bushing with a cup and the trajectory of the ring edge, an intermediate space is reserved in an internal annular groove for said welds or brazes to protrude into, so that said welds or brazes lie outside the trajectory of the ring edge.

6 Claims, 2 Drawing Sheets

(51) Int. Cl.
*F02C 7/22* (2006.01)
*F02C 7/266* (2006.01)
*F23R 3/44* (2006.01)

(52) U.S. Cl.
CPC ............ *F23R 3/44* (2013.01); *F05D 2220/32* (2013.01); *F05D 2230/237* (2013.01); *F05D 2260/30* (2013.01); *F23R 2900/00018* (2013.01)

(56) References Cited

U.S. PATENT DOCUMENTS

| 2014/0137568 A1* | 5/2014 | Bunel | F23R 3/60 60/796 |
| 2015/0059346 A1* | 3/2015 | Bunel | F23R 3/283 60/737 |
| 2015/0354818 A1 | 12/2015 | Lebel et al. | |

OTHER PUBLICATIONS

Written Opinion of the International Searching Authority dated Oct. 14, 2019, issued in corresponding International Application No. PCT/FR2019/051613, filed Jun. 28, 2019, 6 pages.

* cited by examiner

GUIDING DEVICE IN A COMBUSTION CHAMBER

The present invention relates to a device for guiding an element, such as a spark plug or a fuel injector, extending into an orifice or in the vicinity of an orifice of a combustion chamber wall of a turbomachine.

An annular combustion chamber of a turbomachine is defined by two coaxial walls of revolution which extend (relative to axis 34 below) one inside the other and which are connected to each other at their upstream ends by an annular chamber bottom wall.

The chamber bottom wall has openings for the passage of a mixture of air and fuel inside chamber, with air from a compressor of the turbomachine and fuel supplied by injectors.

The upstream side is the side where the mixture of air and fuel reaches the annular combustion chamber.

(In relation to axis 38 below), the injection means, or injectors, extend substantially radially from their outer ends fixed to an outer chamber housing to their heads axially aligned with the holes in the chamber bottom wall.

The outer wall of revolution of the chamber has at least one through-hole for one end of a spark plug, the other end of which can be fixed to an outer casing of the chamber, this spark plug being adapted to initiate combustion of the air/fuel mixture in the chamber.

During operation of the turbomachine, the walls of the combustion chamber expand thermally, causing relative movements between the outer wall of the chamber and the spark plug and between the bottom wall of the chamber and the fuel injectors.

To compensate and allow these relative displacements, spark plug guiding devices and injectors are used, each comprising a substantially coaxial floating ring and flange mounted inside each other. The ring is adapted to be axially traversed by the element and has an external flange guided transversely in an internal groove of the flange. The flange is adapted to be attached to an edge of the combustion chamber wall opening. This flange comprises a sleeve provided with a dropped edge where the sleeve is brazed or welded with a cup, so as to define between them said annular groove. The device has at least one preferred transverse direction of movement of the ring.

The applicant's patent application EP-A1-1 770 332 describes a guiding device of this type. The relative displacements between the outer wall of the chamber and the spark plug mainly take place in a direction parallel to the longitudinal axis of the chamber. During operation, the flange on the chamber wall is therefore essentially displaced in this longitudinal direction relative to the spark plug guide ring supported on the outer housing. The relative displacements of the ring in the flange groove in the other transverse directions are of smaller amplitudes. The axial or longitudinal direction is therefore the preferred direction of movement of the spark plug guide ring in relation to the flange carried by the chamber. The relative movements between the chamber bottom wall and the injectors are mainly in radial directions in relation to the longitudinal axis of the chamber, the preferred direction of relative movement of the ring mounted around an injector is therefore a radial direction in relation to the longitudinal axis of the chamber.

In today's technology, the two parts, cup and flange, forming the flange of a guiding device are fixed to each other at their external peripheries by one or more weld beads extending around the entire circumference of the bushing.

The term weld covers both brazing and actual soldering.

Although maximum care is taken by the operator in charge of making this weld, the weld beads may protrude into the annular guide groove of the ring and locally block the external periphery of this groove, thus reducing or preventing the ring from moving transversely in the flange groove. The welding operation of the flange parts is therefore delicate to carry out and does not allow to control these weld overflows. In addition, there is a risk of jamming of the device and/or damage to the welds, or even breakage, every time the rim of the ring comes into contact with a weld bead that protrudes into the flange groove.

The invention more particularly aims at providing a simple, efficient and cost-effective solution to this problem.

A device is therefore provided for guiding an element in an orifice in a combustion chamber wall of a turbomachine, the device comprising a floating ring and a substantially coaxial flange mounted one inside the other, the ring being adapted to have an element passing axially through it (axis 520a) and comprising an external flange guided transversely (to said axis 520a) in an internal annular groove of the flange, which is adapted to be fixed to an edge of the orifice in the combustion chamber wall, the flange comprising a bushing provided with a fallen edge where the bushing is brazed or welded with a cup, so as to define, between them, said groove, the device having at least one preferred transverse direction of movement of the ring, this device being characterised in that, parallel to said axis (520a), between the welds or brazes and the trajectory (path) of the rim of the ring when the latter is displaced with respect to the bushing in the preferred direction, an intermediate space is reserved, as an extension of said groove.

Thus, said welds or brazes will overflow into this intermediate space; and the welds or brazes will be outside the trajectory of the ring rim.

The solution is simple to implement and economical. With the solution of the invention, said welds or brazes may only protrude into said intermediate space, and thus only into the latter.

One way of moving the intermediate space, and hence the overflow of welds or brazes, away from said trajectory very effectively is to provide for said space to extend around a part of the cup, transversely to said axis (520a), between said part of the cup and the fallen edge.

The desired axial offset will be achieved around said part of the cup.

An effective way of creating this intermediate space, avoiding deformation of the bushing, is to provide for the cup to be stepped by means of a shoulder provided with an external rim by which the cup will have been brazed or welded with an axially elongated end of the fallen edge.

Thus, the shoulder will act as an obstacle or screen between the area of the ring rim trajectory and the overflow area.

Furthermore, rather than shaping the cup with, for example, an inverted U-shaped peripheral shape, oriented, parallel to said axis (520a), towards said groove, it may be preferable that, parallel to this axis, the height (H10 below) of said fallen edge is at least equal to the height (H30 below) of said protrusion plus the thickness of said flange and a clearance J (below) allowing said flange to move in the internal groove of the flange.

Thus, compared to a known situation as shown in FIG. 2 below, the fallen edge will have been "simply" raised along said axis (520a).

And, if, transversely to said axis (520a), the rim sets the shoulder away from the fallen edge, as said part of the cup, thus creating said intermediate space reserved for the overflow of welds or brazes, it will be possible to obtain, transversely to this axis 520a, the most appropriate compromise between the optimal volume for overflow and the smallest space requirement.

Also concerned by the invention is a combustion chamber of a gas turbomachine for an aircraft, the combustion chamber extending annularly around an axis (34 below) and being provided with a guiding device as aforesaid, with all or some of the characteristics mentioned, this guiding device defining a spark plug guide, the element guided in the orifice of said combustion chamber wall being a spark plug which communicates with an interior volume of the combustion chamber through this orifice, the wall in which said orifice is formed being an annular wall radially outer with respect to said axis (34).

In particular, this combustion chamber may further comprise an annular chamber bottom wall connecting said radially outer annular wall to a radially inner annular wall with respect to said axis (34), said annular chamber bottom wall having orifices for mounting systems for injecting a mixture of air and fuel into the combustion chamber.

Thus, an efficient combustion chamber can be offered.

The invention will be better understood, if need be, and other details, characteristics and advantages of the invention will appear upon reading the following description given by way of a non restrictive example while referring to the appended drawings.

DETAILED DESCRIPTION

Figure 1:
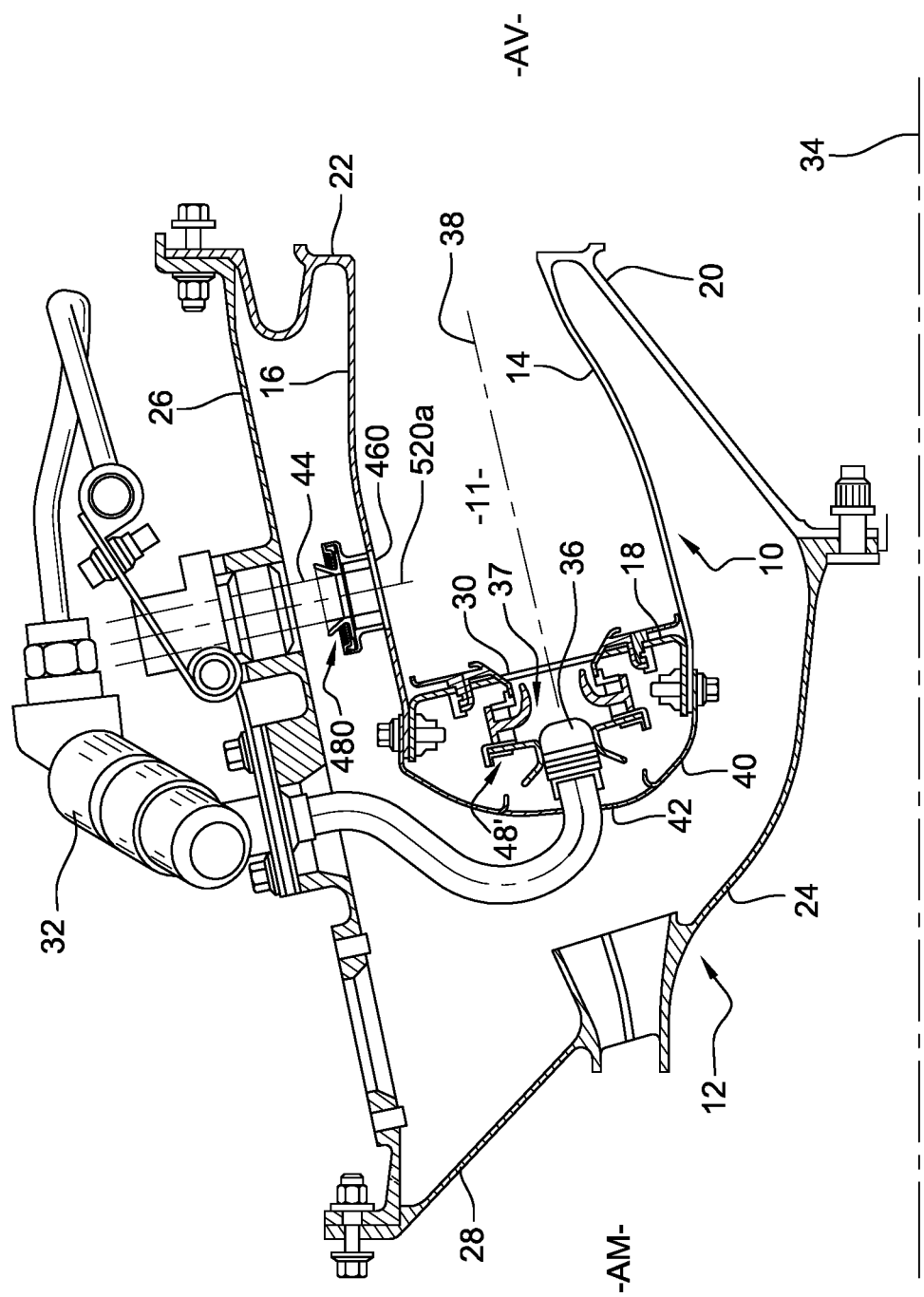
FIG. 1 is a schematic axial cross-sectional half-view (axis 38 below) of a diffuser and a combustion chamber of an aircraft turbomachine.

Firstly, we refer to FIG. 1, which represents an annular combustion chamber 10, for a turbomachine such as an aircraft turbojet engine, arranged at the outlet of an annular diffuser 12, itself located at the outlet of a compressor (not shown). With reference to axis 34 (see below), chamber 10 comprises a (radially) inner wall of revolution, or annular, 14 and a (radially) outer wall 16 of revolution, or annular, connected upstream (AM) to an annular chamber bottom wall 18 and fixed downstream (AV) by radially inner 20 and outer 22 annular flanges respectively to an inner frustoconical web 24 of the diffuser, and to a downstream end of an outer casing 26 of the chamber, the upstream end of this casing 26 being fixed to an outer frustoconical web 28 of the diffuser. Thus, the axial, radial and upstream/downstream aspects are appreciated here in relation to axis 34. The walls 14, 16, 18 define an internal volume 11 of chamber 10 where combustion takes place.

The chamber bottom wall 18 has openings 30 for mounting injection systems 37 of a mixture of air and fuel in chamber 10, with air from diffuser 12 and fuel supplied by injectors 32. The injectors 32 are fixed at their radially outer ends to the outer housing 26 and evenly distributed over a circumference around the axis of rotation 34 of the chamber. Each injector 32 has at its radially inner end a fuel injection head 36 which is guided in an injection system 37 and which is aligned with the axis 38 of one of the corresponding holes 30 of the chamber wall 18, this axis 38 being combined on the drawing with the longitudinal axis of the illustrated section of the chamber. Axis 38 is the axis along which the inner annular wall 14 and outer annular wall 16 extend. The axis 34 of revolution of combustion chamber 10 is parallel to the longitudinal axis of the turbomachine.

Axis 34 and 38 are inclined to each other at an acute angle that diverges from upstream to downstream. It could be different.

An annular cover 40 curved upstream is attached to the upstream ends of chamber walls 14, 16 and 18 and includes air passage holes 42 aligned with holes 30 of the chamber bottom wall 18. The mixture of air and fuel injected into chamber 10 is ignited by at least one spark plug 44 that extends radially outside the chamber. The spark plug 44 is guided at its radially inner end (i.e. in relation to axis 34) in a hole 460 in the outer wall 16 of the chamber, and its radially outer end is fixed by suitable means to the outer housing 26 and connected to power supply means (not shown) located outside the housing 26. A device 48 (which can be replaced by the 480 described below) for guiding, along the radial axis 52a (respectively 520a), the radially inner end (relative to the axis 34 or 38) of the spark plug 44 is fixed outside the chamber 10 on the outer wall 16, around the orifice 46 (respectively 460) to compensate for relative displacements between the outer wall 16 of the chamber and the spark plug 44 carried by the casing 26 during operation of the turbomachine. These relative displacements occur mainly in the longitudinal direction, substantially parallel to axis 38.

A guiding device 48' for the injector head 36 of the injector is also carried by each injection system 37 mounted in an orifice 30 of the chamber wall 18, to compensate for relative displacements between the chamber and the injector which take place mainly in the radial direction with respect to the axis 38.

Figure 2:
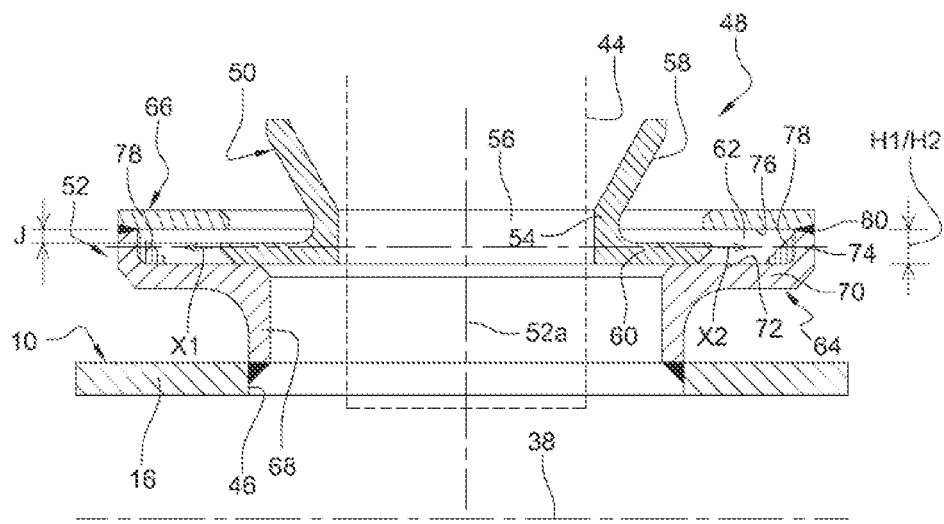
FIG. 2 is a schematic view, in axial section (axis 38 below), of a guiding device according to the prior art.

FIG. 2 shows an embodiment of the above-mentioned overall guidance device in accordance with the previous art, under reference 48, as an alternative to guiding device 480.

The guiding device 48 comprises a floating ring 50 axially traversed (axis 52a) by the spark plug 44 (or injector head 36) and mounted inside one end of a coaxial flange 52. The other end of the flange 52 is attached by brazing, welding or the like to the outer chamber wall 16, around a spark plug port 46 (or attached to the injection system 37 carried by chamber wall 18). The ring 50 consists of a cylindrical part 54 whose internal surface 56 surrounds the spark plug 44 (or injector head 36) with a small amount of play. This cylindrical part 54 is connected at one end to an outwardly flared truncated cone-shaped part 58 which serves to guide the spark plug (or injector head 36) when it is mounted in the device, and has an annular rim 60 at its other end. The annular rim 60 extends radially outwards from the axis of ring 50 and is guided in an internal annular groove 62 of flange 52. Flange 52 consists of two coaxial annular parts 64, 66, respectively called bushing and cup, which are attached to each other by brazing or welding and which define between them the groove 62, here annular, for guiding the external rim 60 of ring 50. In the example shown, flange 52 consists of a bushing 64 and a cup 66. They may each be annular, with a flange 52 with a substantially S or Z-shaped cross-section in axial section along axis 38.

The bushing 64 comprises a cylindrical wall, or chimney, 68 which is welded or brazed at one end to wall 16 (or to the injection system 37) and which is connected at its other end to a wall 70 radial to axis 52a and defining an inner annular surface 72 (always in relation to axis 34) of the groove 62. The radial wall 70 of the bushing 64 is connected at its external periphery to a rim 74 extending on the opposite side to the cylindrical wall 68 and on which the periphery of the cup 66 is applied and welded or brazed.

The rim 74 can be radial to axis 38 and cylindrical. It is similar to a fallen edge whose height H1, along axis 52*a*, defines or at least influences the depth H2 of groove 62, along the same axis. Here, H1=H2.

Cup 66 extends substantially radially from the axis of the bushing and defines another inner annular surface 76 of groove 62, this surface 76 being parallel to surface 72 defined by the first part 64 of the flange. The annular surfaces 72, 76 are used to guide the external rim 60 of the ring in a radial plane or transverse to the axis 52*a* of the flange. The external diameter of the annular rim 60 of ring 50 is smaller than the internal diameter of the cylindrical rim 74 of flange 52 and the external diameter of the cylindrical part 54 of the ring is smaller than the internal diameter of cup 66 to allow movements of ring flange 60 in groove 62 in a transverse plane. In this solution, cup 66 has the appearance of a flat washer. The dimension along axis 52*a*, or thickness, of the external rim 60 of the ring is also less than the depth H2 of groove 62 to allow angular offsets between the axes of ring 50 and flange 52. However, during welding or brazing of the external periphery of cup 66 to the wall 74, molten material 78 penetrates from the connecting zone 80 into the groove 62 and locally closes off this groove over at least part of its periphery, resulting in a reduction in the deflection of the ring 50 in the transverse direction in the groove.

Figure 3:
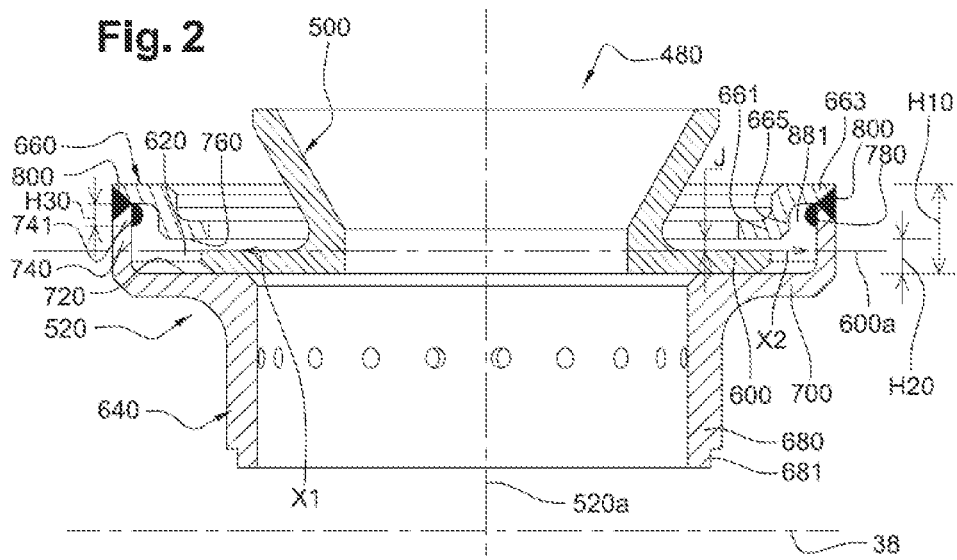
FIG. 3 is a schematic axial sectional view (axis 38 below) of a guiding device according to the invention.

The invention makes it possible to remedy this problem by welding or brazing the cup and the sleeve in (at least) a space zone 881—see FIG. 3—which, radially (in relation to axis 34/38) or parallel to said axis 52*a* (marked 520*a* FIG. 3)
is offset with respect to the preferred direction X1, X2 of movement of the ring flange in the above-mentioned groove, during operation of the combustion chamber; see FIG. 3: trajectory 600*a* of ring 500 rim 600 when the ring 500 is moved, in groove 620, with respect to flange 520. Thus shifted, zone 881 is then far from the same direction X1, X2.

In the preferred solution, and as shown in FIG. 3, it is under these conditions provided, parallel to the axis 520*a*, between the welds or brazes 800 and the trajectory 600*a* of the rim 600, that a said intermediate zone (or space) 881 peripherally extends said groove 620, so that said welds or brazes overflow into it (at 780), so that these welds or brazes are situated outside said trajectory 600*a*, this being regardless of the direction along the preferred direction X1, X2.

The welds or brazes 800 overflow (in 780) only in said intermediate zone (or space) 881, without therefore overflowing into, and thus encroaching on, groove 620, where the rim 600 moves along the trajectory 600*a*.

In the preferred solution shown in FIG. 3, the same parts performing the same functions as in FIG. 2 were identically referenced, to within a multiplication factor of 10.

Their structural and functional differences are outlined below.

Figure 4:
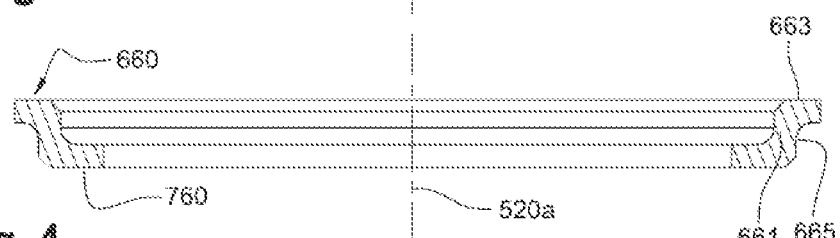
FIG. 4 is an axial section (axis 38 below) of an annular cup that can be mounted on the solution in FIG. 3.

In the preferred design and illustrated in FIGS. 3, 4, the flat cup 66 is replaced by a cup 660 stepped by means of a shoulder 661 provided with an external rim 663 by which the cup 660 is brazed or welded with an axially elongated end 741 (parallel to the axis 520*a*) of the wall or fallen edge 740. Annular cup 66 is therefore a kind of shouldered washer.

Welding or brazing spillage that protrudes into groove 620 of flange 520 and could clog it will therefore no longer limit the movement of rim 600. It is therefore no longer necessary to take these protrusions into account when dimensioning the flange of the guiding device 480.

The intermediate space 881 which extends or extends over said groove 620 between said zone(s) 800 and trajectory 600*a* gives this groove a sort of peripheral curvature, thus creating an additional annular volume to that reserved for radial displacement at axis 520*a* of rim 600, where the weld or braze can overflow.

In this preferred solution, rather than a complicated shape given to cup 660 (with, for example, a peripheral rim oriented, parallel to axis 520*a*, towards wall 700), it was chosen here to create space 881 by increasing the height of wall 740. Parallel to axis 520*a*, the height H10 of wall 740 is equal to the height H30 of overflow 780, increased by the thickness of rim 600 and the clearance J allowing rim 600 to move into groove 620.

This increase in the height H10 of wall 740 compared to H1 of wall 74 allows the braze overflow to be out of trajectory 600*a*.

In the preferred solution shown in FIG. 3, the space 881 extends around part 665 of cup 660, transverse to said axis 520*a*, between this part 665 and wall 740 of flange 520. Peripheral curvature is thus easily achieved.

The so-called 800 weld or solder areas from which the protrusions 780 originate may be formed by several weld spots or by one or more weld beads.

Always in the preferred embodiment and illustrated in FIG. 3, H10>H20.

This can be achieved, in a simple way, without having to deform wall 740, simply by extending it so that H10>H1, and by the shoulder 661 of cup 660 extended by the external rim 663 where the cup is therefore brazed or welded with the end 741 of wall 740.

Thus, space 881 occupies the volume of groove 620 located between wall 740 and part 665 of cup 660, opposite shoulder 661.

No work was done on the chimney 680, nor on its attachment 681 around hole 460.

In a radial plane or transverse to the flange axis 520*a*, the external rim 600 of the ring is now guided between the annular inner surface 760 of the groove 620, located at the base of shoulder 661, and the internal surface 720 of the wall 700 of flange 640. This wall 700, transverse to axis 540*a*, connects chimney 680 to the fallen edge 740.

It may also be noted that with the rim 663, the preferred solution shown in FIG. 3 sets the shoulder 661 away from the fallen wall or edge 740, transverse to axis 520*a*, as the so-called part 663 of the cup. Space 881 is thus obtained.

The invention claimed is:

1. A device for guiding an element in an orifice in a wall of a combustion chamber of a turbomachine, the device comprising a floating ring and a flange which are coaxial and mounted one inside the other, the floating ring being adapted to have an element passing along an axis through the floating ring and comprising an external rim guided transversely in an internal annular groove of the flange, which external rim is adapted to be fixed to an edge of the orifice of the wall of the combustion chamber, the flange comprising a bushing provided with a fallen edge, wherein the bushing is joined with a cup by at least one weld or at least one braze, so as to define said internal annular groove between the bushing and the cup, the device comprising a transverse direction of movement of the floating ring, wherein:

parallel to said axis, between the at least one weld or the at least one braze and a trajectory of the external rim of the floating ring when the floating ring is displaced with respect to the bushing in the transverse direction, an intermediate space is defined, as an extension of said internal annular groove, the at least one weld or the at least one braze form a protrusion protruding into the intermediate space, so that the at least one weld or the at least one braze is located outside said trajectory, and said intermediate space extends around a portion of the cup transversely to said axis, between said portion of the cup and the fallen edge.

2. The device according to claim 1, wherein, parallel to said axis, a height of the fallen edge is at least equal to a height of the protrusion increased by a thickness of the external rim and by a clearance allowing the external rim to move in the internal annular groove.

3. The device according to claim 1, wherein the cup is stepped via a shoulder provided with an external rim by which the cup is brazed or welded with an axially elongated end of the fallen edge.

4. The device according to claim 3 wherein, transversely to said axis, the external rim of the shoulder sets the shoulder away from the fallen edge and thereby defines said intermediate space.

5. A combustion chamber of an aircraft gas turbomachine, the combustion chamber extending annularly about an axis and being provided with a device according to claim 1, which device defines a spark plug guide, the element guided in the orifice of said wall of the combustion chamber being a spark plug which communicates with an interior volume of the combustion chamber through said orifice, the wall in which the orifice is formed being an annular wall radially outward with respect to said axis.

6. The combustion chamber according to claim 5, further comprising an annular chamber bottom wall connecting said annular wall to an annular wall radially inward with respect to said axis, said annular chamber bottom wall having orifices for mounting systems for injecting a mixture of air and fuel into the combustion chamber.

\* \* \* \* \*